US006593424B2

(12) United States Patent
Lee et al.

(10) Patent No.: US 6,593,424 B2
(45) Date of Patent: Jul. 15, 2003

(54) METHOD FOR PREPARING THERMOPLASTIC RESIN

(75) Inventors: Hyung-Sub Lee, Yeosoo (KR); Yun-Chang Jang, Sooncheon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/204,219

(22) PCT Filed: Jan. 8, 2002

(86) PCT No.: PCT/KR02/00027
§ 371 (c)(1),
(2), (4) Date: Aug. 19, 2002

(87) PCT Pub. No.: WO02/053608
PCT Pub. Date: Jul. 11, 2002

(65) Prior Publication Data
US 2003/0032747 A1 Feb. 13, 2003

(30) Foreign Application Priority Data
Jan. 8, 2001 (KR) .............................. 2001/930

(51) Int. Cl.$^7$ ............................ C08L 55/02; C08F 2/02; C08F 4/38
(52) U.S. Cl. ........................ 525/86; 526/65; 526/228; 526/342; 525/233
(58) Field of Search .................... 526/65, 228, 342; 525/86, 233

(56) References Cited

U.S. PATENT DOCUMENTS

| 3,010,935 A | * 11/1961 | Irvin ............................ 525/86 |
| 4,294,946 A | * 10/1981 | Minematsu et al. ...... 525/86 X |
| 4,376,847 A | 3/1983 | Matsubara et al. |
| 4,404,323 A | * 9/1983 | van der Loos et al. ........ 525/86 |
| 4,498,847 A | 2/1985 | Akiyama |
| 4,560,735 A | 12/1985 | Nakagawa et al. |
| 4,618,663 A | 10/1986 | Nakagawa |
| 4,795,780 A | 1/1989 | Wingler et al. |
| 4,874,829 A | 10/1989 | Schwier et al. |
| 4,972,032 A | * 11/1990 | Henton et al. ............. 525/86 X |
| 5,191,040 A | 3/1993 | Okumura et al. |
| 5,254,650 A | 10/1993 | Fukumura |
| 5,274,029 A | 12/1993 | Kelley |
| 5,665,833 A | 9/1997 | Mukaiyama et al. |

FOREIGN PATENT DOCUMENTS

| EP | 0 003 986 A3 | 9/1979 |
| GB | 1100405 | 7/1965 |
| JP | 54-107994 A | 8/1979 |
| JP | 60-245612 A | 12/1985 |
| JP | 62-109807 A | 5/1987 |
| JP | 62-280206 A | 12/1987 |
| JP | 4-218512 A | 8/1992 |
| JP | 5-155941 A | 6/1993 |
| JP | 62-273216 A | 11/1997 |

\* cited by examiner

Primary Examiner—Fred Teskin
(74) Attorney, Agent, or Firm—Birch, Stewart, Kolasch & Birch, LLP

(57) ABSTRACT

A method for continuously preparing a heat resistant α-methylstyrene-acrylonitrile copolymer by bulk polymerization, comprising the steps of: a) Continuously charging a mixture of monomers including following materials into a continuous polymerization system with two or more stirred-vessel reactors connected in series: i) 60 to 75% (by weight of Ýá-methylstyrene; ii) 25 to 40% by weight of acrylonitrile; iii) 5 to 15% by weight of a solvent; and iv) 0.05 to 0.3% by weight of a mixed initiator of an organic peroxide with a multifunctional group and an organic peroxide with a monofunctional group; b) Continuously polymerizing the monomer mixture charged at step a) starting from the first reactor to convert 50 to 70% by weight of total charged monomers into a polymer; and c) transferring reacted liquid containing the polymer from step b) to an evaporator, and then separating the polymer by evaporating unreacted monomers and solvents. Heat resistant α-methylstyrene-acrylonitrile copolymer resins prepared by the method of the present invention are superior in terms of conversion rate, heat resistance and heat stability. Heat resistant ABS resins which contain this copolymer resins exhibit excellent impact strength and processability and low heat discoloration.

7 Claims, No Drawings

METHOD FOR PREPARING THERMOPLASTIC RESIN

This application is the national phase under 35 U.S.C. §371 of PCT International Application No. PCT/KR02/00027 which has an International filing date of Jan. 8, 2002, which designated the United States of America.

BACKGROUND OF THE INVENTION (a) Field of the Invention

This invention relates to a method for preparing a thermoplastic resin having superior heat resistance, and more particularly to a method for preparing a copolymer containing α-methylstyrene and acrylonitrile by continuous bulk polymerization.

(b) Description of the Related Art

Acrylonitrile-butadiene-styrene copolymer resins (hereinafter, called ABS resins) are materials showing good stiffness, impact resistance, surface gloss and chemical resistance, and they are widely used for applications which require these material properties, such as electric and electronic products, and business equipment parts. The ABS resins, however, have low heat resistance and in use, there are constraints in their applications for automobile parts used as interior or exterior materials and the like which require good heat resistance.

Therefore, in order to overcome such limitations, a method of either employing a monomer having good heat resistance or adding inorganic substances to a portion of compositions which constitute the ABS resin may be used.

In general, a method for introducing a monomer having good heat resistance is carried out by adding a maleimide monomer or an α-methylstyrene monomer which have good heat resistance during polymerization, or by mixing a heat resistant copolymer resin which contains heat resistant monomers with ABS resin.

Heat resistant ABS resin prepared by introducing monomers having good heat resistance in some portion should have good properties in impact strength and stiffness as well as heat resistance, and should not raise such problems as decomposition of the resin, thermal discoloration and the like during processing of the resin by extrusion or injection.

Heat resistant copolymer resins as described above are commonly prepared by copolymerizing a maleimide monomer or an α-methylstyrene monomer with vinylcyanide compounds such as acrylonitrile or an aromatic vinyl monomer such as styrene, or by ternary copolymerizing.

Maleimide monomers are characterized by their high reaction rate in polymerization, and thereby arises a problem of controlling the reaction temperature. Further, since α-methylstyrene monomers are characterized by their low depolymerizing temperature (i.e., 61° C.), they not only require prolonged reaction time due to their slow polymerization rate but they also result in polymers which have low molecular weight and which can be easily decomposed by heat.

As these monomers have such properties as described above, methods for producing copolymer resins having good heat resistance are commonly accomplished by emulsion polymerization using batch process which can be carried out at a relatively low temperature and in which the reaction time can be easily controlled.

Various methods are known for the production of copolymer resins having good heat resistance by means of emulsion polymerization. For example, U.S. Pat. No. 3,010,936 discloses a method for producing heat resistant ABS by admixing ABS resin with copolymer or ternary copolymer resin which is prepared by emulsion polymerization of an α-methylstyrene monomer, an acrylonitrile monomer, and a styrene monomer. U.S. Pat. No. 3,367,995 discloses a method for producing heat resistant ABS by emulsion polymerization using rubber latex, styrene, acrylonitrile and α-methylstyrene.

The above referenced methods for producing heat resistant ABS introduce α-methylstyrene to the composition of ABS resin and they have shown to be effective to a certain extent in the improvement of heat resistance.

However, the cited methods have the following problems.

Firstly, emulsion polymerization for producing polymeric resins is typically carried out through a series of processes consisting of polymerization, coagulation, dehydration, and drying, wherein water, emulsifiers, and coagulants are used based on characteristics of the process, with the reaction temperature being lower than that of bulk polymerization.

Secondly, emulsion polymerization can overcome the shortcomings that the resulting resins rarely have high molecular weights due to the low polymerization temperature which is characteristic of α-methylstyrene during the polymerizing process, but on the other hand the slow reaction rate effects extension of the reaction time.

Thirdly, in emulsion polymerization, as the resins have high heat resistance, the coagulation temperature becomes necessarily high, which in turn increases energy consumption during the process as well as making it complicated to set up conditions for the process.

Fourthly, in emulsion polymerization, resins contain a small amount of impurities such as emulsifier and coagulants which are used as supplementary raw materials, and therefore obtained resins are liable to be easily decomposed and discolored by heat when processed through extrusion or injection.

Fifthly, in emulsion polymerization, since acrylonitrile which is more hydrophilic than other monomers undergoes reaction in an aqueous environment, polymers are formed with a higher acrylonitrile content compared with other polymerization processes. Polymers of a high acrylonitrile content are easily discolored by heat and tend to be present as a gel polymer which is insoluble in solvents, eventually remaining as reddish or black impurities and damaging the appearance of the product.

Sixthly, in emulsion polymerization, since there is no recovery process as in the bulk polymerization process by vaporizing unreacted monomers at a high temperature under reduced pressure, a large amount of residual monomers remains within the resin and the residual monomers reduce the heat resistance of the product in proportion to its content.

Because of the problems in the emulsion polymerization process as described above, heat resistant ABS resins produced by use of α-methylstyrene copolymer resins formed by emulsion polymerization have problems of deterioration in external appearance properties, such as lowering of clarity, thermal discoloration and weatherability, as well as odor generation due to decomposition, of the resin, when the ABS resin is processed by extrusion or injection.

As a method for preparing heat resistant ABS resin other than the process using α-methylstyrene copolymer resin, U.S. Pat. No. 4,757,109 and Japanese Patent Publication No. 1983-206657 disclose a method to improve heat resistance of ABS resin by mixing ABS resin with the heat resistant resin produced by emulsion polymerization of maleimide monomer, vinylcyanide monomer and aromatic vinyl compound. These methods are effective to produce resins with high heat resistance in that the more the maleimide monomer content the resin, the higher the heat resistance.

However, as described above, the methods using a maleimide monomer still have problems related to the resins obtained by emulsion polymerization. Moreover, since the reaction proceeds very rapidly and is highly exothermic, there is a limitation in increasing the content of a maleimide monomer within the resin, and in order to overcome such limitation, the polymerization process becomes quite complicated, which is another problem. In addition, the more maleimide is contained within copolymer resins, the poorer the compatibility with ABS resin contained therein, thereby bringing about a problem of reduced impact strength.

On the one hand, U.S. Pat. No. 4,874,829 discloses a method for preparing copolymers or ternary copolymers with α-methylstyrene, acrylonitrile, and maleimide monomers by bulk polymerization. This method employs a large amount of acrylonitrile having a high reactivity in order to overcome the low conversion rate of α-methylstyrene, thereby providing an efficient way to overcome the low conversion rate in the preparation of high heat resistant resins containing α-methylstyrene. However, the reaction mixture of this method includes a high acrylonitrile content, so the resultant resins made by this process tend to be easily discolored and they produce substances like gel which is insoluble in solvents.

U.S. Pat. No. 4,795,780 discloses a method for the preparation of copolymer resins containing α-methylstyrene and acrylonitrile by means of continuous bulk polymerization. This method is also intended to improve the conversion rate in the production of copolymer resins containing α-methylstyrene, wherein α-methylstyrene and acrylonitrile monomers are charged continuously into two stirred-vessel reactors connected in series to carry out copolymerization. Particularly, the process is carried out in such a way that vapor evaporated from the second reactor is condensed through a condenser and the condensate is recharged into the first reactor, whereby the conversion rate can be improved. However, azodiisobutyrodinitrile (AIBN) used as an initiator in this method does not contribute to the improvement of the conversion rate and increasing molecular weight in the copolymerization of α-methylstyrene and acrylonitrile. Moreover, since most of the components of the vapor from the second reactor are acrylonitrile due to the lower boiling point (b.p.) of acrylonitrile than that of α-methylstyrene, when the condensate is recharged to the first reactor, heterogeneous mixing may occur and deviation of monomers composition in the respective reactors may result. In other words, heterogeneous mixing and composition differences will effect the broad distribution of the resin composition obtained, and thereby resin properties will deteriorate.

In the preparation of copolymer resins containing α-methylstyrene, the various aforementioned problems are attributed to intrinsic properties of an α-methylstyrene monomer, and conventional methods may be effective to solve the problems in part, but they can essentially provide only limited improvements.

SUMMARY OF THE INVENTION

In order to overcome conventional problems, it is an object of the present invention to provide a method for preparing a new α-methylstyrene-acrylonitrile copolymer resin having superior heat resistance.

Another object of the present invention is to provide a method for preparing α-methylstyrene-acrylonitrile copolymer resin having superior processability and heat stability as well as superior heat resistance, by bulk polymerization.

Still another object of the present invention is to provide a continuous method for preparing heat resistant α-methylstyrene-acrylonitrile copolymer resin which can be used for the production of heat resistant acrylonitrile-butadiene-styrene (ABS) resin, which has superior heat resistance, processability, impact strength, and low thermal decomposition and discolorat mixed with grafted ABS resin.

Still another object of the present invention is to provide a continuous method for preparing heat resistant α-methylstyrene-acrylonitrile copolymer resin which can be used for the production of resins having high purity, and with no impurities such as emulsifiers or coagulants.

In order to achieve these objects and others, the present invention provides a continuous method for preparing heat resistant α-methylstyrene-acrylonitrile copolymer by bulk polymerization, the method comprising the steps of:

a) Continuously charging a mixture of monomers including following materials into a continuous polymerization system with two or more stirred-vessel reactors connected in series:
  i) 60 to 75% by weight of α-methylstyrene;
  ii) 25 to 40% by weight of acrylonitrile;
  iii) 5 to 15% by weight of solvent; and
  iv) 0.05 to 0.3% by weight of mixed initiator of an organic peroxide with a multifunctional group and an organic peroxide with a monofunctional group;

b) Continuously polymerizing the monomer mixture charged at step a) by starting from the first reactor to convert 50 to 70% by weight of total charged monomers into a polymer; and c) transferring the polymer solution from step b) to a devolatilizer, and then separating the polymer by devolatilizing unreacted monomers and solvents.

The present invention according to above method further comprises a step of d) condensing the unreacted monomers and the solvents which were evaporated in step c) to obtain condensates, and recharging the condensates as a raw material to step a).

DETAILED DESCRIPTION OF THE PREFERRED EMBODIMENTS

A preferred embodiment of this invention will be explained in the followings.

The present invention provides a method for preparing heat resistant α-methylstyrene copolymer resins by continuous bulk polymerization, and more specifically, a mixture of monomers comprising α-methylstyrene, acrylonitrile and a mixed initiator of organic peroxides to generate a radical is continuously charged into a polymerizing system consisting of two or more stirred-vessel reactors connected in series, and after 50 to 70% by weight of the charged monomers is converted to polymer, unreacted monomers and solvents are removed by devolatilizer, whereby heat resistant α-methylstyrene copolymer resins with superior heat resistance and Tensile strength are obtained, with lower heat decomposition and thermal discoloration properties.

Heat resistant α-methylstyrene copolymer resins prepared by the method according to the present invention include 73 to 68 parts by weight of α-methylstyrene and 27 to 32 parts by weight of acrylonitrile, the weight average molecular weight of the resins being in the range of 80,000 to 110,000, providing high purity resins with residual monomer at less than 3000 ppm and being free from impurities such as emulsifiers or coagulants.

Further, a heat resistant ABS resin prepared by compounding said heat resistant α-methylstyrene copolymer resin with ABS resin not only has excellent heat resistance, processability and impact resistance but it also has advantages of the least decomposition of resin and thermal discoloration when the resin is processed by extrusion or injection.

The method for preparing α-methylstyrene copolymer resins having superior heat resistance comprises the steps of introducing raw materials, polymerizing, separating and re-using by recycling, each step of which will be described more specifically in the following.

In the step of introducing raw materials, 75 to 60 parts by weight of α-methylstyrene, 25 to 40 parts by weight of acrylonitrile, 5 to 15 parts by weight of solvents, and 0.05 to 0.3 parts by weight of 2 kinds of organic peroxides as an initiator to generate radicals are mixed homogeneously, then charged into a polymerization system in a continuous way. The initiator used in the method is a mixed initiator consisting of 99 to 80 parts by weight of organic peroxide with a multifunctional group and 1 to 20 parts by weight of organic peroxide with a monofunctional group.

For heat resistant resins containing α-methylstyrene, the content of an α-methylstyrene monomer and its structure constituting the chain of polymers is very important. When the content of an α-methylstyrene monomer among the charged monomers exceeds a certain level, a structure in which more than three molecules of α-methylstyrene are successively combined with the chain of the resin produced is rapidly formed, the structure being liable to be easily decomposed. On the other hand, when the portion of the α-methylstyrene monomer is less than a certain level, heat resistance is decreased and the degree of yellowing by heat becomes significant. At the same time, gel polymers are formed which include a large amount of acrylonitrile and which are insoluble in solvents. The gel polymers are thermally unstable and upon heating they act as reddish or black impurities, thereby damaging the appearance of the product.

Therefore, in the preparation of an α-methylstyrene copolymer by continuous bulk polymerization, it is preferable to use mixed monomers consisting of 75 to 60 parts by weight of α-methylstyrene and 25 to 40 parts by weight of acrylonitrile in order to obtain copolymer resins having superior heat resistance, and reduced thermal discoloration, decomposition, and gel production, and the thus obtained α-methylstyrene copolymer resin would contain 73 to 68 parts by weight of α-methylstyrene monomer portion and 27 to 32 part by weight of acrylonitrile.

Further, since α-methylstyrene characteristically has a low conversion rate and a low molecular weight due to its low polymerization temperature, it is necessary to overcome such limitations in order to commercialize the production.

The inventors of the present invention carried out studies to solve the above-mentioned problems using various initiators, and they found that polymerization by using an initiator having an appropriate mixed ratio of organic peroxides with a multifunctional group and a monofunctional group can provide copolymer resin having a high molecular weight and a high conversion rate.

Preferred organic peroxides with a multifunctional group used in the present invention as initiators include 1,1-bis(tert-butylperoxy)-2-methylcyclohexane, 1,1-bis(tert-butylperoxy)cyclohexane, 1,1-bis(tert-butylperoxy) -3,3,5-trimethylcyclohexane, 2,2-bis(tert-butylperoxy)butane, and 2,2-bis(4,4-tert-butylperoxycyclohexyl)propane; and preferred organic peroxides with a monofunctional group include ditertiary butylperoxide, dicumyl peroxide and tertiary butylcumyl peroxide.

Though the polymerization reactors used in the present invention are not particularly limited, it is preferable to use a stirred-vessel equipped with an upstream heat exchanger as the first reactor and a stirred-evaporator type vessel equipped with a storage tank, a condenser, and a pressure control valve as the second or additional reactor thereof.

Since the heat of reaction of α-methylstyrene is relatively low, in some cases, the amount of heat to be removed from the first reactor may be very small or it may even be necessary to supply heat. Thus, any type of reactor may be used, but in order to ensure homogeneous temperature control it is preferable to have a heat exchanger equipped at upstream of the reactor.

It is preferable that the temperature control of the second or additional reactor thereof is carried out in such a manner that a portion of unreacted monomer or solvent which is vaporized by adjusting the reactor pressure is recycled into the reactor through the condenser and the storage tank.

In the present invention, an α-methylstyrene copolymer resin is prepared continuously by bulk polymerization in the reactor system consisting of a set of two or more stirred-vessel reactors connected in series. More specifically, mixed raw materials are charged continuously into the first reactor to proceed the polymerization, and resulting polymers from the first polymerization by using an initiator having an appropriate mixed ratio of organic peroxides with a multifunctional group and a monofunctional group can provide copolymer resin having a high molecular weight and a high conversion rate.

Preferred organic peroxides with a multifunctional group used in the present invention as initiators include 1,1-bis(tert-butylperoxy)-2-methylcyclohexane, 1,1-bis(tert-butylperoxy)cyclohexane, 1,1-bis(tert-butylperoxy) -3,3,5-trimethylcyclohexane, 2,2-bis(tert-butylperoxy)butane, and 2,2-bis(4,4-tert-butylperoxycyclohexyl)propane; and preferred organic peroxides with a monofunctional group include ditertiary butylperoxide, dicumyl peroxide and tertiary butylcumyl peroxide.

Though the polymerization reactors used in the present invention are not particularly limited, it is preferable to use a stirred-vessel equipped with an upstream heat exchanger as the first reactor and a stirred-evaporator type vessel equipped with a storage tank, a condenser, and a pressure control valve as the second or additional reactor thereof.

Since the heat of reaction of α-methylstyrene is relatively low, in some cases, the amount of heat to be removed from the first reactor may be very small or it may even be necessary to supply heat. Thus, any type of reactor may be used, but in order to ensure homogeneous temperature control it is preferable to have a heat exchanger equipped at upstream of the reactor.

It is preferable that the temperature control of the second or additional reactor thereof is carried out in such a manner that a portion of unreacted monomer or solvent which is vaporized by adjusting the reactor pressure is recycled into the reactor through the condenser and the storage tank.

In the present invention, an α-methylstyrene copolymer resin is prepared continuously by bulk polymerization in the reactor system consisting of a set of two or more stirred-vessel reactors connected in series. More specifically, mixed raw materials are charged continuously into the first reactor to proceed the polymerization, and resulting polymers from the first reactor are continuously transferred to the second or additional reactor thereof which is connected to the first reactor, proceeding the remaining unreacted monomers polymerized.

Raw materials of the present invention may be divided into portions and charged separately into the first and second or additional reactor thereof in order to reduce the differences of resin composition prepared in each of the reactors. For example, mixtures may be charged in a ratio of 90 to 70 parts by weight to the first reactor and 10 to 30 parts by weight to the second or additional reactor thereof.

The reason for such separate charging is derived from the fact that evaporated vapor from the reactor comprises 80 to 90 parts by weight of acrylonitrile monomer since α-methylstyrene has a much higher b.p. than acrylonitrile. Therefore, heterogeneous resins or gel may be produced by heterogeneous mixing of condensates or mixing of condensates with reactants, during the recharging process of the liquid which contains a large amount of the acrylonitrile component. Moreover, according to the reaction characteristics, an azeotropic point is formed when the polymer composition produced under the condition of the monomer ratio of 72 parts by weight of α-methylstyrene and 28 parts by weight of acrylonitrile and the composition of charged monomers are identical, and in a region which departs from the azeotropic point, the composition of polymers produced will gradually change as the conversion rate increases. That is, the composition of the resins formed in each reactor may differ slightly, thereby a composition distribution of final polymers may be formed.

Therefore, composition deviation between reactors can be reduced by charging the mixed monomers of 10 to 30 parts by weight into the second or additional reactor thereof via a storage tank to which the condensate is recycled. The aforementioned problems can also be solved by diluting the condensate components with charged monomers.

In the first reactor, 20 to 35% by weight of charged monomers are converted to polymer while keeping a reaction temperature of 100 to 130° C. and a resident time of 2 to 4 hours, and in the second or additional reactor thereof 50 to 70% by weight of charged monomers are converted to polymer under the condition of a reaction temperature of 100 to 130° C. and a resident time of 2 to 4 hours.

The solvents of the present invention are used for controlling reaction viscosity and reaction temperature and they can include, for example, ethylbenzene, toluene, xylene, methylethyl ketone and the like, but toluene, methylethyl ketone or a mixture of these which has a low b.p. are preferable in consideration of the high b.p. of α-methylstyrene.

The reactants discharged from the reactor after polymerization in the continuous polymerization reactors are transferred into the evaporator equipped with the heat exchanger in which an operational condition of 200 to 250° C. and 50 torr of pressure or below, preferably 20 to 30 torr is maintained, wherein unreacted monomers and solvents are vaporized and then condensed again to be reused as raw materials, and resultant polymers are transferred to an extruder and processed into a product with a pellet shape. Throughout these processes, the amount of residual monomers can be kept at not more than 3000 ppm.

The present invention will be explained in further detail referring to following Examples and Comparative Examples. However, the Examples set forth herein are intended for illustration only and not to limit the present invention.

EXAMPLE 1

70 parts by weight of α-methylstyrene, 30 parts by weight of acrylonitrile, 5 parts by weight of toluene, 0.135 parts by weight of 1,1-bis (tert-butylperoxy)-3,3,5-trimethylcyclohexane and 0.015 parts by weight of ditertiary butylperoxide were mixed in a vessel and the resulting-mixture was charged continuously into a polymerizing reactor consisting of two stirred-vessels with capacities of 30L and 50L respectively and connected in series, in such a way that the flow rates of the mixture to the first reactor (first stirred-vessel) and the second reactor were respectively 9.6 L/hr and 2.4 L/hr.

The volume of the reactant solution filled into the reactors were both maintained to be 30L, and the polymerization was proceeded continuously keeping the temperature at 110° C. Devolatilizer equipped with a heat exchanger, unreacted monomers and solvents were removed from the polymerized solution by keeping the temperature at 250° C. and the pressure at 20 torr. Obtained polymer was then transferred to an extruder by a discharge pump, through which it was processed into pellet shapes.

The pellets were used to measure the properties including molecular weight, acrylonitrile content, loss on heat decomposition of the resin, gel content and glass transition temperature.

In the measurements, gel permeation chromatography was used for molecular weight; an element analyzer was used for acrylonitrile content; flow index was measured according to ASTM D-1238 (220° C., 10 kg); loss on heat decomposition of the resin was determined by checking loss of weight of the pellets which were put onto aluminum foil and then subjected to 3 hr of heating at 270° C. in an oven; gel content was determined through a process in which the pellets were completely dissolved in tetrahydrofuran to be a solution of 10% by weight, then the solution was filtered using a 20 μm filter and the weight of the substance remaining on the filter was checked to obtain a ratio of the weight relative to initial weight of the pellets; and the glass transition temperature (Tg) was determined by means of differential scanning calorimeter (DSC).

In addition, 40 parts by weight of graft ABS resin (DP212, product of LG Chemical Co., Ltd.) and 10 parts by weight of acrylonitrile-styrene copolymer resin (80HF, product of LG Chemical Co., Ltd.) were mixed with 50 parts by weight of the pellets prepared as above and after the mixture was extruded, a test piece which was used for the test of properties of impact strength, flow index and thermal discoloration was prepared through an injection mold.

The impact strength and melt flow index were tested according to ASTM D-256 and ASTM D-1238 (220° C., 10 kg) respectively, and thermal discoloration was tested by measuring the color difference (ΔE) between said test piece and a reference test piece which was injected through the same injection mold with the resident time in the injection mold being 10 minutes.

Those properties including composition of mixed monomers, physical properties of heat resistant α-methylstyrene-acrylonitrile copolymer resin and physical properties of heat resistant ABS resin are listed in the following Table 1.

EXAMPLE 2

The same process in Example 1 was carried out except that the flow rate of charged monomers to the first reactor was 12 L/hr, and there was nothing charged to the second reactor.

Properties including composition of mixed monomers, physical properties of heat resistant α-methylstyrene-acrylonitrile copolymer resin and physical properties of heat resistant ABS resin are listed in the following Table 1

COMPARATIVE EXAMPLE 1

70 parts by weight of α-methylstyrene, 30 parts by weight of acrylonitrile, 0.5 parts by weight of tert-dodecylmercaptan, 0.3 parts by weight of cumene hydroperoxide and 100 parts by weight of deionized water were charged in a batch reactor, and they were reacted at 75° C. for 12 hr to be polymerized, and the obtained latex was then solidified at 120° C. with a KCl aqueous solution, and washed and dried to obtain a white powder as the resin product.

This resin was subjected to measurement of powder properties in the same manner as in Example 1, and heat resistant ABS resin was prepared by the same method as in Example 1, then properties of injection molded resin were measured.

Composition of said mixed monomers, and properties of heat resistant α-methylstyrene-acrylonitrile copolymer resin and heat resistant ABS resin are listed in the following Table 1.

COMPARATIVE EXAMPLE 2

The same process as in Example 1 was carried out except that among the charged mixture of monomers the amount of α-methylstyrene was changed to 80 parts by weight and that of acrylonitrile was changed to 20 parts by weight.

Composition of said mixed monomers, and properties of heat resistant α-methylstyrene-acrylonitrile copolymer resin and heat resistant ABS resin are listed in the following Table 1.

COMPARATIVE EXAMPLE 3

The same process as in Example 1 was carried out except that among the charged mixture of monomers the amount of α-methylstyrene was changed to 43 parts by weight and that of acrylonitrile was changed to 57 parts by weight.

Composition of said mixed monomers, and properties of heat resistant α-methylstyrene-acrylonitrile copolymer resin and heat resistant ABS resin are listed in the following Table 1.

COMPARATIVE EXAMPLE 4

The same process as in Example 1 was carried out except that among the charged mixture of monomers the initiator was changed to 0.15 parts by weight of azoisobutyronitrile.

Composition of said mixed monomers, and properties of heat resistant α-methylstyrene-acrylonitrile copolymer resin and heat resistant ABS resin are listed in the following Table 1.

COMPARATIVE EXAMPLE 5

The same process as in Example 1 was carried out except that among the charged mixture of monomers the initiator was changed to 0.15 parts by weight of ditertiary butylperoxide.

Composition of said mixed monomers, and properties of heat resistant α-methylstyrene-acrylonitrile copolymer resin and heat resistant ABS resin are listed in the following Table 1.

COMPARATIVE EXAMPLE 6

The same process as in Example 1 was carried out except that among the charged mixture of monomers the initiator was changed to 0.15 parts by weight of 2,2-bis(tert-butylperoxy)butane.

Composition of said mixed monomers, and properties of heat resistant α-methylstyrene-acrylonitrile copolymer resin and heat resistant ABS resin are listed in the following Table 1.

TABLE 1

| | Example 1 | Example 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Mixed Raw Material (parts by weight) | | | | | | | | |
| Acrylonitrile | 30 | 30 | 30 | 20 | 43 | 30 | 30 | 30 |
| α-Methylstyrene | 70 | 70 | 70 | 80 | 57 | 70 | 70 | 70 |
| Toluene | 5 | 5 | — | 5 | 25 | 5 | 5 | 5 |
| Deionized water | — | — | 100 | — | — | — | — | — |
| 1,1-bis(tert-butylperoxy)-3,3,5-trimethylcyclohexane | 0.135 | 0.135 | — | 0.135 | 0.135 | — | — | — |
| Ditertiary butylperoxide | 0.015 | 0.015 | — | 0.015 | 0.015 | — | 0.15 | — |
| Azoisobutyronitrile | — | — | — | — | — | 0.15 | — | — |
| 2,2-bis(tert-butylperoxy)butane | — | — | — | — | — | — | — | 0.15 |
| Cumene hydroperoxide | — | — | 0.3 | — | — | — | — | — |
| Copolymer Resin | | | | | | | | |
| Acrylonitrile (part by wt.) | 28.2 | 28.3 | 26.5 | 26.1 | 34.2 | 28.2 | 28.2 | 28.4 |
| α-Methylstyrene (parts by wt.) | 71.8 | 71.7 | 73.5 | 73.9 | 65.8 | 71.8 | 71.8 | 71.6 |
| Conversion rate (%) | 60 | 61 | 96 | 35 | 73 | 42 | 28 | 53 |
| Weight average Mol. Wt. (g/mol) | 95000 | 93000 | 115000 | 70000 | 105000 | 75000 | 90000 | 87000 |
| Glass Transition Temp. (° C.) | 125 | 125 | 125 | 117 | 119 | 118 | 121 | 121 |

TABLE 1-continued

|  | Example 1 | Example 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Flow Index (g/10 min) | 12 | 13 | 6 | 33 | 4 | 29 | 16 | 20 |
| Gel Content (% by wt.) | 0 | 0 | 2 | 0 | 0.2 | 0 | 0 | 0 |
| Loss on Heat Decomposition (% by wt.) | 4.9 | 5.3 | 26 | 18 | 4.7 | 6.0 | 5.0 | 5.1 |
| Heat Resistant ABS |  |  |  |  |  |  |  |  |
| Impact Strength (kg/cm$^3$) | 36 | 33 | 19 | 26 | 39 | 31 | 34 | 32 |
| Flow Index (g/10 min) | 10 | 11 | 7 | 18 | 6 | 15 | 11 | 13 |
| Thermal discoloration | 4.0 | 4.1 | 6.5 | 3.8 | 5.4 | 4.3 | 4.1 | 4.3 |

Heat resistant α-methylstyrene-acrylonitrile copolymer resins prepared by the method according to the present invention provide superior conversion rates, heat resistance and heat stability, while a heat resistant ABS resin comprising said resins exhibits superior impact strength and processability with reduced thermal discoloration properties.

What is claimed is:

1. A method for continuously preparing a heat resistant α-methylstyrene-acrylonitrile copolymer by bulk polymerization, comprising the steps of:
   a) Continuously charging a mixture of monomers including following materials into a continuous polymerization system with two or more stirred-vessel reactors connected in series:
      i) 60 to 75% by weight of α-methylstyrene;
      ii) 25 to 40% by weight of acrylonitrile;
      iii) 5 to 15% by weight of a solvent; and
      iv) 0.05 to 0.3% by weight of a mixed initiator including an organic peroxide with a multifunctional group and an organic peroxide with a monofunctional group;
   b) Continuously polymerizing the monomer mixture charged at step a) by starting from the first reactor to convert 50 to 70% by weight of total charged monomers into a polymer; and
   c) transferring the polymer solution from step b) to a devolatilizer, and then separating the polymer by devolatilizing unreacted monomers and solvents.

2. The method of claim 1, further comprising the step of:
   d) condensing the unreacted monomers and the solvents which were evaporated in step c) to obtain condensates, and recharging the condensates as a raw material of step a).

3. The method of claim 1, wherein the mixture of monomers of step a) is dividedly charged in a ratio of 90 to 70 parts by weight into a first reactor of the polymerization system, and 10 to 30 parts by weight into a second or additional reactor thereof of the polymerization system.

4. The method of claim 1, wherein the polymerization of step b) is carried out under a condition of a reaction temperature of 100 to 130° C. and a resident time of 2 to 4 hours.

5. The method of claim 1, wherein said mixed initiator comprises organic peroxide with a multifunctional group and organic peroxide with a monofunctional group having a mixing ratio by weight of 99:1 to 80:20 in the order thereof.

6. The method of claim 1, wherein
   said organic peroxide with a multifunctional group is selected from the group consisting of 1,1-bis(tert-butylperoxy)-2-methylcyclohexane, 1,1-bis(tert-butylperoxy)cyclohexane, 1,1-bis(tert-butylperoxy)-3,3,5-trimethylcyclohexane, 2,2-bis(tert-butylperoxy)butane, and 2,2-bis(4,4-ditert-butylperoxycyclohexyl) propane; and
   said organic peroxide with a monofunctional group is selected from the group consisting of ditertiary butyl peroxide, dicumyl peroxide and ditertiary butylcumyl peroxide.

7. A heat resistant ABS resin composition comprising heat resistant α-methylstyrene-acrylonitrile copolymer resin, which is prepared by the method according to claim 1.

* * * * *